United States Patent
Van Der Burgt

(10) Patent No.: US 10,808,122 B2
(45) Date of Patent: *Oct. 20, 2020

(54) FLAME RETARDANT SEMI-AROMATIC POLYAMIDE COMPOSITION AND MOULDED PRODUCTS MADE THEREFROM

(75) Inventor: Frank Peter Theodorus Johannes Van Der Burgt, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 37 days.

This patent is subject to a terminal disclaimer.

(21) Appl. No.: 14/117,444

(22) PCT Filed: May 8, 2012

(86) PCT No.: PCT/EP2012/058417
§ 371 (c)(1),
(2), (4) Date: May 12, 2015

(87) PCT Pub. No.: WO2012/165227
PCT Pub. Date: Nov. 22, 2012

(65) Prior Publication Data
US 2015/0252188 A1 Sep. 10, 2015

(30) Foreign Application Priority Data
May 13, 2011 (EP) .................................... 11166068

(51) Int. Cl.
C08L 77/06 (2006.01)
C08K 7/14 (2006.01)
C08K 5/5313 (2006.01)
C08K 3/013 (2018.01)
C08K 5/3492 (2006.01)

(52) U.S. Cl.
CPC .............. *C08L 77/06* (2013.01); *C08K 3/013* (2018.01); *C08K 5/34922* (2013.01); *C08K 5/5313* (2013.01); *C08K 7/14* (2013.01); *C08L 2205/02* (2013.01); *C08L 2205/025* (2013.01)

(58) Field of Classification Search
CPC ....... C08L 77/02; C08L 77/04; C08K 5/3492; C08K 5/34922; C08K 5/5313
See application file for complete search history.

(56) References Cited

U.S. PATENT DOCUMENTS

| 4,463,166 A | * | 7/1984 | Bour | C08G 69/28 528/336 |
| 4,804,703 A | * | 2/1989 | Subramanian | 524/444 |
| 2002/0019497 A1 | * | 2/2002 | Mawatari | C08G 69/26 525/418 |
| 2007/0054992 A1 | * | 3/2007 | Urata | C08L 77/10 524/100 |
| 2007/0072970 A1 | | 3/2007 | Schneider | |
| 2009/0029138 A1 | * | 1/2009 | Miyoshi | C08L 71/12 428/220 |
| 2009/0030124 A1 | * | 1/2009 | Yin | 524/126 |
| 2010/0069539 A1 | | 3/2010 | Morimoto et al. | |
| 2012/0024577 A1 | * | 2/2012 | Stroeks | B29C 55/005 174/254 |
| 2013/0203910 A1 | * | 8/2013 | Zhang | C08L 77/10 524/133 |
| 2015/0361263 A1 | * | 12/2015 | Van Der Burgt | C08J 5/00 524/133 |
| 2018/0118937 A1 | * | 5/2018 | Van Der Burgt | C08K 7/14 |

FOREIGN PATENT DOCUMENTS

| EP | 2431419 A1 | * | 3/2012 | |
| JP | 09279023 A | * | 10/1997 | |
| WO | WO 2010081871 A1 | * | 7/2010 | C08J 5/18 |

OTHER PUBLICATIONS

Stanyl ForTii (Recommendations for injection molding: Stanyl ForTii LED4U (NC1103Q), DSM, Mar. 2015, 6 pages).*
EcoPaXX (Recommendations for injection molding: EcoPaXX Q170E, DSM, Mar. 2015, 6 pages).*
Derwent Abstract No. 1983-39654K (1983, 2 pages) to show that JP 58083029 is the same as U.S. Pat. No. 4,463,166.*
Google patents translation of JP 09279023 (1997, 4 pages).*
International Search Report for PCT/EP2012/058417, dated Jan. 21, 2013.
Database WPI, Week 200502, Accession No. 2005-015687 & JP 2004-300189, (Oct. 28, 2004), Abstact.

* cited by examiner

Primary Examiner — Brieann R Johnston
(74) Attorney, Agent, or Firm — Nixon & Vanderhye P.C.

(57) ABSTRACT

The invention relates to a flame retardant polyamide composition comprising (A) a semi-crystalline semi-aromatic polyamide, (B) a semi-crystalline aliphatic polyamide and (C) a halogen free flame retardant system comprising a metal salt of a (di)phosphinic acid, a melamine condensation product, a polyphosphate salt of melamine or a polyphosphate salt of a melamine condensation product, or any mixture thereof; wherein the weight ratio of (A):(B) is in the range of 75:25-98:2, and (B) has a number average molecular weight (Mn) of more than 7500 g/mol. The invention also relates to an article made of the flame retardant polyamide composition.

20 Claims, No Drawings

FLAME RETARDANT SEMI-AROMATIC POLYAMIDE COMPOSITION AND MOULDED PRODUCTS MADE THEREFROM

This application is the U.S. national phase of International Application No. PCT/EP2012/058417, filed 8 May 2012, which designated the U.S. and claims priority to EP Application No. 11166068.4, filed 13 May 2011, the entire contents of each of which are hereby incorporated by reference.

The present invention relates to flame retardant polyamide compositions, more particular halogen free flame retardant polyamide compositions based on semi-aromatic polyamides that can be used in electric/electronic components to be processed in an SMT mounting step.

Polyamide resins possess excellent mechanical properties, mouldability, and chemical resistance, in comparison to many other thermoplastic moulding materials, and have therefore been used in automotive parts, electric/electronic (E&E) components, mechanical components, and many other applications. Articles made from polyamide resins can possess extremely desirable physical properties. However, in certain applications, it is desirable that polyamide resin compositions are flame retardant and meet UL-94 standards for a high degree of flame retardancy, and have properties such as a high flow, no blistering, high surface quality and/or have a high stiffness and good dimensional stability. A high degree of flame retardancy is required in almost all E&E applications. Because of the ongoing trend of miniaturization of E&E components, high flowability is becoming ever more important. Absence of blistering is essential in surface mounting soldering processes. High stiffness, good dimensional stability and good surface quality are required, for example, for use in computer housings.

Because of their physical properties such as high mechanical properties and high heat deflection temperatures, reinforced high-melting polyamides flame-retarded with halogenated flame retardants have conventionally been used for E&E components for surface mounting application. The polyamides used herein such as for example semi-aromatic polyamides based on terephthalic acid, adipic acid and hexamethylenediamine, or based on terephthalic acid, hexamethylenediamine and 2-methyl-1,5-pentanediamine, have melting points of about 280° C. and higher such as for example aliphatic polyamide-4,6, which has a melting point of about 290° C.

Surface mounting technologies (SMT) involve applying a solder-containing paste to a printed circuit board (PCB), placing electrical and electronic components on appropriate places on the surface of the PCB, and passing the entire assembly through an infrared reflow oven that serves to melt the solder and permanently affix the components to the PCB. Older, through-hole methods required that holes be drilled and that each component be individually soldered in place. SMT has permitted the manufacture of smaller and denser layouts than were possible using through-hole techniques, and the resulting boards are generally cheaper to manufacture. However, in SMT processes the parts can be heated to temperatures as high as 260° C., or even higher, for example peak temperatures of 270° C. are reached. It is important that the plastic electronic parts do not warp or deform or blister under these conditions.

The components are made from such a polyamide composition by using a melt-processing method such as injection moulding. However, care must be taken for humid conditions during storage. Because of the absorption of water associated with these polymers, voids are formed therein when they are heated in ovens during processing, a phenomenon also known as blistering. The resulting parts are consequently undesirably deformed. Also aromatic polyamides, but in particular aliphatic polyamides, are prone to blistering. Furthermore, aliphatic polyamides are more difficult to be made flame retardant in sufficient extent, an essential requirement for use in such SMT applications.

According to the down sizing trend of electrical electronics devises, the need of high melt flow is increasing for the resins used in the SMT applications. High melt flow (or low melt viscosity, as these terms are used interchangeably) is a very desirable characteristic of a melt-processable polymer resin composition, as it allows for greater ease of use in processes such as injection moulding. A composition with higher melt flow or lower melt viscosity can be injection moulded with greater ease compared to another resin that does not possess this characteristic. Such a composition has the capability of filling a mould to a much greater extent at lower injection pressures and temperatures and a greater capability to fill intricate mould designs with thin cross-sections. For a linear polymer there is typically a positive correlation between polymer molecular weight and melt viscosity; for branched polymers this is generally the case too.

To achieve desired physical properties, components such as for example glass reinforcing agents, are added to a polymer resin. To achieve desired levels of flame retardancy, flame retardants can be added. Whereas in the past primarily polymeric halogen containing flame retardants were used, since quite some time already the use of such flame retardants has become critical or even banned in several applications. This leaves non-halogenated flame retardants to become the only material of choice. WO-96/17013 describes a halogen-free flame-retardant polyamide composition comprising polyamides with a melting point of at least 270° C. and a melamine condensation product. The use of non-halogenated flame retardants such as phosphate or phosphinate compounds with triazine derivatives has been disclosed in WO-96/09344. WO-97/026026 describes a halogen-free flame-retardant polyamide composition comprising a compound derived from triazine and an organic phosphorus compounds. EP-0792912-A1 discloses compositions comprising polyamide and phosphinate or diphosphinate. EP-1070754-A1 discloses compositions comprising polymers such as polyamide or polyester, with a flame retardant comprising phosphinate or diphosphinate and melamine derivatives such as condensation products of melamine. EP-1024167-A1 discloses compositions comprising thermoplastic polymers such as polyamide 6 or polyamide 6,6 with a flame retardant comprising phosphinate or diphosphinate and a synthetic inorganic compound and/or a mineral product, such as zinc stannate.

High temperature polyamides incorporating halogen free flame-retardants have been used and are generally satisfactory for conventional applications. However, the presence of components such as glass reinforcing agents and flame retardants often lead to an increase in the melt viscosity of the resulting polymer composition. These additional components are typically added using a melt blending process, and will preferably be sufficiently well dispersed in the polymer matrix to obtain optimal physical properties. A good dispersion is not only important for obtaining a homogenous composition and properties, but in particular for a good surface quality. The dispersal of the components during melt blending will often occur more efficiently when the polymer matrix has a high viscosity. This is a problem with polyamides in general, but in particular with halogen free flame retardant polyamide compositions.

Aliphatic polyamides, apart from their sensitivity to blistering are difficult to make sufficiently flame retardant and need high amounts of halogen free flame retardant components, resulting in high melt viscosities, in particular when to be combined with glass reinforcing agents.

Aromatic polyamides can be made flame retardant with lower amounts of halogen free flame retardants than corresponding aliphatic polyamides, but even then generally suffer from a too high melt viscosity. Furthermore, it has been observed that it is impossible to make glass fibre reinforced flame retardant grades with a sufficient degree of flame retardancy, high stiffness and good surface quality.

Although the flow might be improved by lowering the molecular weight of the polymer, this has a negative impact on other properties of the composition and moulded parts made thereof, in particular mechanical properties.

From the patent literature, alternative solutions have been proposed, which include the addition of low molecular weight compounds, or combination with a polyamide oligomer, however, these do not provide the desired properties, or present other problems.

According to US-2010/113655-A1, with a condensation polymer such as a polyamide, it is often possible to obtain a composition that has both well dispersed additives and a low melt viscosity by using high molecular weight matrix polymer in conjunction with a molecular-weight reducing additive in the melt blending process. In this method, the matrix polymer will have a sufficiently high melt viscosity to ensure an adequate dispersion of additives and the action of the molecular-weight reducing agent will result in a lower molecular weight matrix polymer. US-2003/018135 cited in US-2010/113655-A1 discloses the use of aliphatic organic acids in the preparation of impact modified polyamide compositions that have both good melt flow and toughness. However, according to US-2010/113655-A1, the use of aliphatic acids disclosed in this publication can lead to rapid corrosion of the steel elements of the processing equipment used in the melt blending processes. US-2006/030693 cited in US-2010/113655-A1 discloses the use of terephthalic acid as an agent to increase melt flow of a high temperature polyamide composition. However, according to US-2010/113655-A1 the use of terephthalic acid disclosed in this publication can lead to deterioration of resistance against the void formation at SMT process. Also, out-gassing from the polyamide composition at a moulding process may cause problems such as mould deposit on surface of mould cavities. The solution suggested in US-2010/113655-A1 is to use an aromatic dicarboxylic acid with a molecular weight higher than 180 g/mol. The addition of the low molecular weight compounds has the disadvantage that the mechanical properties of the polyamide composition deteriorate, unless the molecular weight of the starting polyamide is raised above normal, requiring longer production times.

Another solution to improve the melt flow is described in EP-1572797-A1. EP-1572797-A1 describes a halogen free flame retardant polyamide composition comprising a halogen free phosphorous containing flame retardant and a blend of a polyamide polymer having a weight average molecular weight (Mw) of at least 10.000 g/mol and a polyamide prepolymer or oligomer with an Mw of at most 7500 g/mol. However, it has been discovered that the use of such low Mw polyamide prepolymers or oligomers in a halogen free flame retardant polyamide composition based on a semi-aromatic polyamide can lead to loss in flame retardancy properties, even when the low Mw polyamide prepolymer or oligomer is used in only a small amount.

In response to the above concerns, there is increasingly a demand for materials that have more stringent property requirements than those of current polyamides in the industry. In particular, there is a need for high temperature halogen free flame-retarded, reinforced polyamide moulding compositions, which suitably can withstand the severe constraints associated with the manufacture of electrical or electronic components, which show sufficiently good flame retardant properties, can withstand solder temperatures applied in SMT processes without blistering and meanwhile exhibit an improved flow. There is also a need for reinforced halogen free flame-retarded polyamide moulding compositions, which show sufficiently good flame retardant properties, have a high stiffness and can be moulded into parts with a good surface quality.

According to the present invention there is provided a flame retardant polyamide composition comprising
(A) a semi-crystalline semi-aromatic polyamide;
(B) a semi-crystalline aliphatic polyamide; and
(C) a halogen free flame retardant system comprising a metal salt of a (di)phosphinic acid, or a melamine condensation product, or a pyrophosphate salt or polyphosphate salt of melamine or a melamine condensation product, or any mixture thereof;
wherein the weight ratio of (A):(B) is in the range of 75:25-98:2, and (B) has a number average molecular weight (Mn) of more than 7500 g/mol.

According to the present invention there is provided a flame retardant polyamide composition comprising
(A) a semi-crystalline semi-aromatic polyamide having a melting temperature of at least 270° C.;
(B) a semi-crystalline aliphatic polyamide; and
(C) a halogen free flame retardant system comprising a metal salt of a (di)phosphinic acid, or a melamine condensation product, or a pyrophosphate salt or polyphosphate salt of melamine or a melamine condensation product, or any mixture thereof;
wherein the weight ratio of (A):(B) is in the range of 75:25-98:2, and (B) has a number average molecular weight (Mn) of more than 7500 g/mol.

The effect of the composition according to the invention, comprising the halogen free flame retardant in combination with a blend of a semi-aromatic and an aliphatic polyamide in said ratio, is its advantageous improved melt flow, with retention of good flame retarding properties and resistance against high oven temperatures with improved blistering behaviour, eventually even without the formation of blistering and deformation of those moulded components or parts. This result is highly surprising: for the flow improvement no low molecular weight components are used; using higher amounts of aliphatic polyamide does not result in a further significant improvement in flow. At the same time, despite the use of an aliphatic polyamide, the flame retardancy is retained at a similar high level, comparable to that of the corresponding composition without the aliphatic polyamide.

According to another embodiment of the present invention there is also provided a flame retardant polyamide composition comprising
(A) a semi-crystalline semi-aromatic polyamide;
(B) a semi-crystalline aliphatic polyamide;
(C) a halogen free flame retardant system comprising a metal salt of a (di)phosphinic acid, or a melamine condensation product, or a pyrophosphate salt or polyphosphate salt of melamine or a melamine condensation product, or any mixture thereof; and
(D) 45-70 wt %, based on the total composition, of inorganic filler and/or reinforcement agent, wherein the weight ratio of (A):(B) is in the range of 75:25-98:2, and (B) has a number average molecular weight (Mn) of more than 7500 g/mol.

Preferably, in said embodiment, the reinforcement agent is a fibrous reinforcement agent, more preferably the inorganic filler and/or fibrous reinforcement agent comprises glass fibres, more preferably at least 50 wt % of (D) consists of glass fibres.

The effect of this composition according to the invention, comprising the halogen free flame retardant in combination with a blend of semi-aromatic and aliphatic polyamide in said ratio, and the inorganic fillers and/or reinforcement agents in the given amount is its high stiffness and good surface properties, with retention of good flame retarding properties. This result is highly surprising: the high stiffness is not merely obtained by the high content in glass fibres, but it is accompanied with a good surface quality evidencing a homogenously dispersed material. Further for the improvement in surface quality no low molecular weight components need to be used. Surprisingly, despite the use of an aliphatic polyamide in the composition, the flame retardancy is retained at a level, comparable to that of corresponding compositions based on semi-aromatic polyamides but with lower glass fibre content and without the aliphatic polyamide.

Halogen free flame retardant polyamide compositions based on semi-aromatic polyamides are described for example in WO-2005/033192 and US-2010/0249292. The compositions may optionally comprise aliphatic polyamides. WO-2005/033192 describes a composition with 9.3 phr of a polyamide 6T/6I, a semi-aromatic polyamide, and 38.7 phr of polyamide-66, an aliphatic polyamide (weight ratio 19.3:80.7). Neither of the two documents describes a blend of a semi-aromatic and an aliphatic polyamide with the weight ratio and the molecular weight as according to the present invention. Halogen free flame retardant polyamide compositions based on blends of aliphatic polyamides and semi-aromatic polyamides are also described in, for example, EP-1741753-A1. Herein, the polyamides are generally present in an weight ratio of 60-99 wt % of aliphatic polyamide and 1-40 wt % of semi-aromatic polyamide, with typical values in the range of 80-96 wt % of aliphatic polyamide and 4-20 wt % of semi-aromatic polyamide, with the wt % relative to the total weight of polyamide.

Semi-crystalline polyamides typically have a melting temperature (Tm) and a melting enthalpy (ΔHm), as well as a glass transition temperature (Tg). With the term melting temperature is herein understood the melting temperature (Tm) as determined by the method according to ISO-11357-3.2, 2009, in an $N_2$ atmosphere with a heating and cooling rate of 10° C./min, from the peak value of the melting peak in the second heating cycle. In case there are multiple melting peaks, the peak value is to be taken from the highest melting peak. With the term glass transition temperature is herein understood the glass transition temperature (Tg) as determined by the method according to ISO-11357-3.2, 2009, in an $N_2$ atmosphere with a heating and cooling rate of 10° C./min.

The number average molecular weight (Mn) and the weight average molecular weight (Mw) referred to herein, are determined by size-exclusion chromatography (SEC) combined with different detectors. The SEC-system consisted of three PFG Linear XL columns (300 mm×8 mm ID) supplied by Polymer Standards Service, operating at 0.4 ml/min and thermostatted at 35° C. For the measurements a refractive index detector (RI), a viscometer and a right-angle laser-light scattering detector were used and molar masses were calculated using these triple detector signals to yield molar-masses. The injection volume was 75 μl. Hexafluoroisopropanol with 0.1% (w/w) potassium trifluoro acetate was used as eluent. All samples were filtered over a 0.1 μm filter before injection.

The amount of (A) in the flame retardant polyamide composition according to the invention is preferable at least 77 weight percent (wt %), more preferably at least 79 wt %, and also preferably at most 96 wt %, more preferably at most 94 wt % Herein the weight percent is relative to the total amount of (A) and (B). The advantage of a higher minimal amount of (A) is that the flame retardancy is better preserved. The advantage of a higher minimal amount of aliphatic polyamide (B), thus a lower maximal amount of (A), is that the melt flow as well as the blistering behaviour of the composition is further improved. Accordingly, the weight ratio of (A):(B) is preferably is in the range of 77:23-96:4, preferably 79:21-94:6, as this results in a further optimized balance in properties.

Most compositions of the present invention have been found to provide improved blister performance against polyamide compositions suitable for E/E connector applications. Several compositions under the scope of the present invention were found to comply with the requirements of the JEDEC 2/2a blister test (IPC/JEDEC J-STD-020C July 2004). In contrast, comparative examples with corresponding compositions but with for example a low molecular weight polyamide oligomer as flow improver did not comply with this industry standard.

The semi-crystalline semi-aromatic polyamide (A) in the flame retardant polyamide composition according to the invention includes at least one semi-aromatic polyamide which is thermoplastic and has a melting temperature and has been derived from at least one monomer containing at least one aromatic group. The semi-crystalline semi-aromatic polyamide may consist of one semi-aromatic polyamide or a mixture of different semi-aromatic polyamides, which may be one or more homopolymers, copolymers, terpolymers, or higher polymers.

It is preferred that for the semi-aromatic polyamide used in the present invention about 10 to about 75 mole percent of the monomers contain aromatic groups. Accordingly, preferably about 25 to about 90 mole percent of the monomers are aliphatic or cylcoaliphatic compounds. When more than one semi-aromatic polyamide is used, the amount refers to the total of the semi-aromatic polyamides. More preferably about 20 to about 55 mole percent of these monomers contain aromatic groups.

Examples of suitable monomers containing aromatic groups are terephthalic acid and its derivatives, isophthalic acid and its derivatives, naphthalene dicarboxylic acid and its derivatives, $C_6$-$C_{20}$ aromatic diamines, p-xylylenediamine and m-xylylenediamine. Preferably, the semi-crystalline semi-aromatic polyamide has been derived from monomers containing terephthalic acid and its derivatives.

The semi-aromatic polyamide can further contain one or more different monomers, either aromatic, aliphatic or cycloaliphatic. Examples of aliphatic or cylcoaliphatic compounds from which the semi-aromatic polyamide may further be derived include aliphatic and cycloaliphatic dicarboxylic acids and its derivatives, aliphatic $C_4$-$C_{20}$ alkylenediamines and/or $C_6$-$C_{20}$ alicyclic diamines, and amino acids and lactams. Suitable aliphatic dicarboxylic acids are, for example, adipic acid, sebacic acid, azelaic acid and/or dodecanedioic acid. Suitable diamines include butanediamine, hexamethylenediamine; 2-methylpentamethylenediamine; 2-methyloctamethylenediamine; trimethylhexamethylene-diamine; 1,8-diaminooctane, 1,9-diaminononane; 1,10-diaminodecane and 1,12-diaminododecane. Examples of suitable lactams and amino acids are 11-aminododecanoic acid, caprolactam, and laurolactam.

Examples of preferred semi-aromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I), poly(caprolactam-hexamethylene terephthalamide) (polyamide 6/6,T), hexamethylene terephthalamide/hexamethylene isophthalamide (6,T/6,I) copolymer, polyamide 10,T/10,12, polyamide 10T/10,10 and the like.

The semi-crystalline semi-aromatic polyamide (A) preferably has a melting temperature (Tm-A) of at least 270° C., more preferably at least 280° C., and still more preferably in the range of 280-350° C., or even better 300-340° C. Thus the composition will be better capable to withstand the severe SMT conditions. A higher melting temperature can generally be achieved by using a higher content in terephthalic acid and/or shorter chain diamines in the polyamide. The person skilled in the art of making polyamide moulding compositions will be capable of making and selecting such polyamides.

In a preferred embodiment of the invention, semi-crystalline semi-aromatic polyamide (A) has a number average molecular weight (Mn) of more than 5,000 g/mol, preferably in the range of 7,500-50,000 g/mol, more preferably 10,000-25,000 g/mol. This has the advantage that the composition has a good balance in mechanical properties and flow properties.

The semi-crystalline aliphatic polyamide (B) in the flame retardant polyamide composition according to the invention, may be derived from aliphatic and/or alicyclic monomers such as one or more of adipic acid, sebacic acid, azelaic acid, dodecanedioic acid, or their derivatives and the like, aliphatic $C_4$-$C_{20}$ alkylenediamines, alicyclic diamines, lactams, and amino acids. Suitable diamines include bis(p-aminocyclohexyl)methane; butanediamine, hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane. Suitable lactams or amino acids include 11-aminododecanoic acid, caprolactam, and laurolactam.

Suitable aliphatic polyamides include for example polyamide 6; polyamide 6,6; polyamide 4,6; polyamide 4,8, polyamide 4,10, polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; and polyamide 6,13; and any mixtures and copolymers thereof.

Preferably, the semi-crystalline aliphatic polyamide (B) comprises polyamide 4,6, or polyamide 4,8 or polyamide 4,10, or any mixture or copolymer thereof.

The semi-crystalline aliphatic polyamide (B) suitably has a melting temperature (Tm-B) of at least 220° C., and preferably in the range of 250-300° C. A higher Tm-B improves the blistering performance.

In a preferred embodiment of the invention, (B) has a number average molecular weight (Mn) of more than 10,000 g/mol, and less than 100,000 g/mol. Preferably Mn is in the range of 12,000-50,000 g/mol, more preferably 15,000-25,000 g/mol. This has the advantage that the composition has an optimum balance in flow properties and flame retardancy, high temperature tensile strength and blister resistance.

The flame retardant system (C) in the polyamide composition according to the invention comprises a metal salt of a (di)phosphinic acid, a melamine condensation product, or a melamine based polyphosphate, or any mixture thereof.

Suitable salts of (di)phosphinic acids that can be used in the composition according to the present invention are, for example, a phosphinate of the formula (I), a disphosphinate of the formula (II),

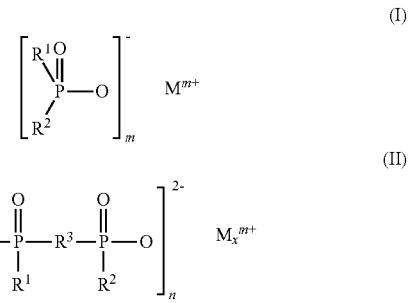

or polymers of these wherein $R^1$ and $R^2$ may be identical or different and are linear or branched $C_1$-$C_6$ alkyl and/or aryl; $R^3$ is linear or branched $C_1$-$C_{10}$-alkylene, $C_6$-$C_{10}$-arylene, -alkylarylene or -arylalkylene; M is one or more of calcium ions, magnesium ions, aluminum ions and zinc ions, m is 2 or 3; n is 1 or 3; x is 1 or 2. $R^1$ and $R^2$ may be identical or different and are preferably methyl, ethyl, n-propyl, isopropyl, n-butyl, tert-butyl, n-pentyl and/or phenyl. $R^3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably chosen to be an aluminum ion or zinc ion. These compounds are disclosed in U.S. Pat. No. 6,255,371 which is hereby incorporated herein by reference.

Examples of melamine condensation products in the compositions according to the present invention are melam, melem, melon, and higher oligomers and any mixtures of two or more thereof.

Examples of polyphosphate salts that can be used in the present invention include melamine polyphosphate, melem polyphosphate, melam polyphosphate and melon polyphosphate, and any mixtures of two or more of these.

In a preferred embodiment of the present invention, the flame retardant system comprises melem.

In another preferred embodiment of the present invention, the flame retardant system comprises a metal salt of a (di)phosphinic acid. Preferred phosphinates are aluminum methylethylphosphinate and/or aluminum diethylphosphinate, more preferably aluminum diethylphosphinate.

Suitably, flame retardant system (C) is present in an amount of 1-100 parts by weight (pbw) relative to 100 pbw of (A)+(B). When more than one flame retardant is present in the flame retardant system (C) the amount refer to the total of all of them. Preferably, the amount of (C) is in the range of 5-50 parts by weight (pbw) relative to 100 pbw of (A)+(B). More preferably, the flame retardant system (C) is present in an amount that is about 10 to about 30 pbw, relative to 100 pbw of (A)+(B).

The polyamide composition of the present invention may optionally comprise further components, such as other flame retardants and flame retardant synergists, inorganic fillers, reinforcing agents, other polymers. The polyamide compositions of the present invention may also contain additives. Additives may be selected from, for example, acid scavengers, impact modifiers, plasticizers, stabilizers (such as, for example, thermal stabilizers, oxidative stabilizers, UV light stabilizers and chemical stabilizers), processing aids (such as, for example, mould release agents and nucleating agents), solid lubricants, colorants (such as carbon black, other pigments, dyes), nanoclays etc.

Examples of suitable flame retardant synergists include silicone, metal oxides such as silica, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide, metal powder such as aluminum, iron, titanium, manganese, zinc, molybdenum, cobalt, bismuth, chromium, tin, antimony, nickel, copper and tungsten, and metal salts such as barium metaborate, zinc carbonate, magnesium carbonate, calcium carbonate, and barium carbonate. When used, the one or more synergists are suitably present in about 2 to about 20 wt %, for example about 5 wt % or about 10 wt %, the wt % based on the total weight of flame retardant system (C). The weight % of synergist relates to the total of all synergists present.

When the polyamide composition comprises a metal phosphinate, the polyamide composition suitably also contains zinc borate. By the term "zinc borate" is meant one or more compounds having the formula $(ZnO)_x(B_2O_3)_y(H_2O)_z$. The zinc borate can be present in an amount of, for example about 1 to about 5, or preferably about 1 to about 4, or more preferably about 1.2 to about 3.7, or yet more preferably about 1.4 about 3.6 wt %, relative the weight of the phosphinates. The weight % of zinc borate relates to the total of all zinc borates present. For the purposes of determining the amount of zinc borate present, if the zinc borate is a hydrate (i.e., Z is not zero), the weight of the corresponding anhydrous form of the zinc borate is used, thus only the amounts of ZnO and $B_2O_3$ present in the zinc borate compound are considered to contribute to the zinc borate weight that is used in the calculation. As used herein in conjunction with the amount of zinc borate used in a composition, the term "zinc borate" refers to the anhydrous form of the compound in question. Zinc borate is available in different grades from US Borax under the tradename Firebrake. Suitable forms of zinc borate are those in which X=4, Y=1, and Z=1 (Firebrake 415); in which X=2, Y=3, and Z=3.5 (Firebrake 290); and in which X=2, Y=3, and Z=0 (Firebrake 500).

Examples of inorganic fillers and/or reinforcing agents that the composition may optionally comprise, include one or more of glass fibres, glass flakes, kaolin, clay, talc, mica, wollastonite, calcium carbonate, silica, carbon fibres, potassium titanate, etc. Preferably the reinforcing agent is a fibrous reinforcing agent, more preferably glass fibres are used.

In the flame retardant polyamide composition according to the invention, the inorganic filler and/or reinforcing agent (D), if used, are suitably present in a total amount of 1-250 parts by weight (pbw), preferably 25-200 pbw, more preferably 50-150 pbw relative to 100 pbw of (A)+(B).

In a case where high stiffness is required, such as for example, for use in housings for electronic devices such as for notebooks, mobile phones and PC tablets, the inorganic filler and/or reinforcing agent used in the present invention may be present in the range from 45 wt % up to 70 wt %, or preferably in the range from 50-65 wt %, based on the total weight of the composition. The weight % relates to the total of all inorganic fillers and reinforcing agents, when more than one of them is present.

In case a high flow is required, such as for connectors with a high aspect ratio, i.e. thin but relatively long as in DDR connectors, the amount of the inorganic filler and/or reinforcing agent is suitably up to about 45 wt %, or more preferably up to about 40 wt %, based on the total weight of the composition.

When used, as for example in high stiffness applications, the reinforcing agents and/or fillers are preferably present in about 5 to about 70 weight percent, preferably 5-60 wt %, more preferably in about 5 to about 55 weight percent, or more preferably in about 5 to 50 weight percent, based on the total weight of the composition.

In a particular embodiment, the flame retardant polyamide composition consists of
(A) 30-76 wt % of the semi-crystalline semi-aromatic polyamide;
(B) 2-19 wt % of the semi-crystalline aliphatic polyamide;
(C) 4-35 wt % of the flame retardant system;
(D) 0 up to 45 wt % of inorganic filler and/or fibrous reinforcement agent;
(E) 0-20 wt % of other polymers; and
(F) 0-20 wt % of additives;
wherein the wt % are all relative to the total weight of the composition.

More particular in compositions with from 20 up to 45 wt % glass fibre reinforcement, the amount of flame retardant system (C) suitably is in the range of 4-30 wt %, preferably 6-25 wt %, more preferably 8-20 wt %, wherein the wt % are relative to the total weight of the composition.

For instance, if the composition comprises about 30 wt % of glass fibre reinforcement, and about 40-55 wt % of polyamide components it suitably comprises about 5 to about 20 wt % flame retardant, wherein the wt % are all relative to the total weight of the composition.

In each of these cases the amount of other polymers (E), i.e. polymers other than (A) and (B), is preferably limited, if used at all. The amount of (E) is preferably in the range of 0-10 wt %, more preferably 0-5 wt %. Also the amount of other additives (F), i.e. additives other than components (A)-(E), is kept limited, although generally not completely avoided as generally some auxiliary additives need to be added. Preferably, the total amount of additives (F) is in the range of 0.1-15 wt %, more preferably 0.2-10 wt % and even better 0.3-5 wt %.

In another particular embodiment, the flame retardant polyamide composition consists of
(A) 15-40 wt % of a semi-crystalline semi-aromatic polyamide;
(B) 1-10 wt % of a semi-crystalline aliphatic polyamide,
(C) 2-20 wt % of the flame retardant system;
(D) 45-70 wt % of inorganic fillers and/or fibrous reinforcement agents;
(E) 0-10 wt % of other polymers; and
(F) 0-10 wt % of other additives;

wherein the wt % are all relative to the total weight of the composition.

More particular in compositions with 50-65 wt % glass fibre reinforcement, the amount of flame retardant (C) suitably is in the range of 3-15 wt %, preferably 4-12 wt %, more preferably 5-10 wt %, wherein the wt % are relative to the total weight of the composition.

For instance, if the composition comprises about 60 wt % of glass fibre reinforcement, and about 25-36 wt % of polyamide components and it suitably comprises about 4 to about 15 wt % flame retardant, wherein the wt % are all relative to the total weight of the composition.

Also in each of these cases the amount of the other polymers (E) and of the other additives (F) are preferably limited, if used at all. The amount of (E) is preferably in the range of 0-5 wt %. Preferably, the total amount of other additives (F) is in the range of 0.1-7.5 wt %, more preferably 0.2-5 wt % and even better 0.3-2 wt %.

In each of these two embodiments, and the particular compositions thereof, the flame retardant system (C) preferably comprises, or even consists of a metal salt of a (di)phosphinate.

The compositions according to the invention can be prepared by a process, wherein the semi-aromatic polyamide, the aliphatic polyamide, the flame retardant system and optional additional ingredients are melt-blended. Part of the materials may be mixed in a melt-mixer, and the rest of the materials may then be added and further melt-mixed until uniform. Melt-blending may be carried out using any appropriate method known to those skilled in the art. Suitable methods may include using a single or twin-screw extruder, blender, kneader, Banbury mixer, moulding machine, etc. Twin-screw extrusion is preferred, particularly when the process is used to prepare compositions that contain additives such as flame retardants, and reinforcing agents. The compositions of the present invention have a high melt flow and may be conveniently formed into a variety of articles using injection moulding, rotomoulding and other melt-processing techniques. The articles are useful in SMT applications among others and include connectors and housings for electronic devices, for example housings for notebooks, mobile phones and PC tablets.

The invention is further illustrated with the following examples and comparative experiments.

MATERIALS

The following ingredients are used for the compositions reported in Tables 1, 2 and 3. Ingredient quantities are given in weight percentages based on the total weight of the composition.
PPA-1 semi-aromatic polyamide: PA4T copolymer, Tm=320° C., Mn 8,000 g/mol, Mw 16,000 g/mol
PPA-2 semi-aromatic polyamide: PA4T copolymer, Tm=320° C., Mn 10,000 g/mol, Mw 20,000 g/mol
APA-P1 aliphatic polyamide polymer PA46 based, Tm=295° C., Mn 18,000 g/mol, Mw 36,000 g/mol
APA-P2 aliphatic polyamide polymer PA410 based, Tm=250° C., Mn 15,000 g/mol, Mw 30,000 g/mol
APA-O3 aliphatic polyamide oligomer PA46 based, Tm=288° C., Mn 1,000 g/mol, Mw 2,000 g/mol
APA-O4 aliphatic polyamide oligmer PA66 based, Tm=250° C., Mn 2,000 g/mol, Mw 4,000 g/mol
Flame retardant Exolit® OP 1230, an aluminum diethylphosphinate available from Clariant.
Glass Fibre Standard glass fiber grade, circular shape, for polyamide compositions Determination of Tm by DSC (According to ISO-11357-3.2, 2009)

The measurements of the melting temperature Tm were carried out with a Mettler Toledo Star System (DSC) using a heating and cooling rate of 10° C./min. in an N2 atmosphere. For the measurements a sample of about 5 mg pre-dried powdered polymer was used. The pre-drying was carried out at high vacuum, i.e less than 50 mbar and at 105° C. during 16 hrs. The sample was heated from 0° C. to a temperature about 30° C. above the melting temperature at 10° C./min, immediately cooled to 0° C. at 10° C./min and subsequently heated to about 30° C. above the melting temperature again at 10° C./min. For the melting temperature Tm the peak value of the melting peak in the second heating cycle was determined. In case of multiple melting peaks, the highest melting peak is used.

Determination of Mn and Mw by GPC

The number average molecular weight (Mn) the weight average molecular weight (Mw) referred to herein were determined by size-exclusion chromatography (SEC) combined with different detectors. The SEC-system consisted of three PFG Linear XL columns (300 mm×8 mm ID) supplied by Polymer Standards Service, operating at 0.4 ml/min and thermostatted at 35° C. For the measurements a refractive index detector (RI), a viscometer and a right-angle laser-light scattering detector was used and molar masses were calculated using these triple detector signals to yield molar-masses. The injection volume was 75 µl. Hexafluoroisopropanol with 0.1% (w/w) potassium trifluoro acetate was used as eluent. All samples were filtered over a 0.1 µm filter before injection.

Preparation of Compositions

Examples I-VIII and Comparative Examples A-K

The compositions of Examples I-VIII and Comparative Examples A-K, shown in Table 1 and 2 were prepared by melt-blending the constituting components on a Werner & Pfleiderer ZE-25 twin screw extruder using a 330° C. flat temperature profile. The constituents were fed via a hopper, glass fibers were added via a side feed. Throughput was 20 kg/h and screw speed was 200 rpm. The settings typically resulted in a measured melt temperature between about 340 and about 350° C. The polymer melt was degassed at the end of the extruder. The melt was extruded into strands, cooled and chopped into granules.

Injection Moulding of Test Bars

Dried granulate material was injection moulded in a mould to form test bars with a thickness of 4 mm conforming ISO 527 type 1A multipurpose specimens. Dried granulate material was also injection moulded in a mould to form test bars according to UL 94 test bars of 0.8 mm thick. The temperature of the melt in the injection moulding machine was 340° C., the temperature of the mould was 120° C. The test bars were used to measure the flame retardant properties and mechanical properties of the compositions, the results of which are shown in Tables 1 and 2.

Melt Flow by Spiral Flow Length

Spiral flow length was determined on spiral cavity with dimensions 280×15×1 mm at a temperature 340° C. and a mould temperature of 120° C. at an effective injection pressure of 100 MPa.

Mechanical Properties: Tensile Test

The mechanical properties (tensile modulus [MPa], tensile strength [MPa], elongation at break [%]) were measured in a tensile test according to ISO 527 at 23° C.

Impact Test Notched Izod

The impact properties were determined at 23° C. according to ISO 180/1A.

Heat Distortion Temperature

The heat distortion temperature was measured according to ISO 75-2 with a nominal 1.80 MPa stress applied (HDT-A).

Flame Retardancy Test

The flame retardancy was determined according Underwriters Laboratories test method UL 94, using 0.8 mm test bars, conditioned for 48 hours at 23° C., 50% relative humidity, respectively for 168 hours at 70° C., 85% relative humidity.

Blistering Test

The tensile bars were also used for the blistering test. The blistering test was executed applying test conditions according JEDEC level 2. First the samples were conditioned for 168 hrs at 85° C. and 60% relative humidity, thereafter the samples were put in a reflow soldering oven, subjected to the prescribed temperature profile thereby heated to a maximum temperature 260° C. JEDEC level 2 is achieved if no blistering is observed after reflow soldering conditions after conditioning the samples for 168 hrs at 85° C. and 60% relative humidity.

TABLE 1

| | Experiment | | | | | | | | | | |
|---|---|---|---|---|---|---|---|---|---|---|---|
| | EX-I | EX-II | EX-III | EX-IV | CE-A | CE-B | CE-C | CE-D | CE-E | EX-V | EX-VI |
| Components in wt % | | | | | | | | | | | |
| PPA-1 | 56.55 | 55.1 | 52.2 | 46.4 | 58 | 40.6 | 34.8 | 29 | 55 | 49.5 | 54.9 |
| APA-P1 | 1.45 | 2.9 | 5.8 | 11.6 | | 17.4 | 23.2 | 29 | | 5.5 | 6.1 |
| Glass Fibres | 30 | 30 | 30 | 30 | 30 | 30 | 30 | 30 | 30 | 30 | 30 |
| Flame Retardant | 12 | 12 | 12 | 12 | 12 | 12 | 12 | 12 | 15 | 15 | 9 |
| Properties | | | | | | | | | | | |
| Spiral Flow length [mm] [@ 100 MPa] | 157.2 | 161.4 | 168.1 | 191.4 | 150.3 | 184.6 | 196.8 | 181.6 | 132.5 | 157.5 | 178.4 |
| Tensile properties @ 23° C. | | | | | | | | | | | |
| E-Mod [Mpa] | 10319 | 10266 | 10571 | 10214 | 10207 | 9988 | 10005 | 9986 | 10464 | 10385 | 10229 |
| Tensile strength [Mpa] | 122.3 | 125.6 | 124.7 | 126.4 | 130.5 | 128.1 | 130.8 | 142.1 | 132.3 | 117.8 | 127.4 |
| Elongation [%] | 1.75 | 1.8 | 1.74 | 1.84 | 1.88 | 1.84 | 1.96 | 2.14 | 1.95 | 1.76 | 1.72 |
| Notched Charpy [kJ/m2] [@ 23° C.] | 6.7 | 6.5 | 7 | 6.5 | 6.9 | 6.5 | 6.6 | 7.4 | 7.2 | 6.5 | 6.6 |
| HDT A [° C.] [@1.80 MPa, 120° C./h] | 299 | 297 | 291 | 276 | 301 | 269 | 268 | 276 | 303 | 290 | 293 |
| UL94V | | | | | | | | | | | |
| 48 hrs @ 23° C./ 50% RH | V0 | V0 | V0 | V0 | V0 | V0 | V0 | V1 | V0 | V0 | V0 |
| 168 hrs @ 70° C. | V0 | V0 | V0 | V0 | V0 | V1 | V1 | V1 | V0 | V0 | V0 |
| Overall rating | V0 | V0 | V0 | V0 | V0 | V1 | V1 | V1 | V0 | V0 | V0 |
| Blisterring (Jedec 2 cond) | +− | No | No | No | Yes | | | | Yes | No | No |

TABLE 2

| | Experiment | | | | | | | | |
|---|---|---|---|---|---|---|---|---|---|
| | CE-A | EX-VII | EX-VIII | CE-F | CE-G | CE-H | CE-I | CE-J | CE-K |
| Components in wt % | | | | | | | | | |
| PPA-1 | 58 | 56.55 | 55.1 | | | | | | |
| PPA-2 | | | | 58 | 53 | 48 | 43 | 48 | 43 |
| APA-P2 | | 1.45 | 2.9 | | | | | | |
| APA-O3 | | | | | 5 | 10 | 15 | | |
| APA-O4 | | | | | | | | 10 | 15 |
| Glass Fibres | 30 | 30 | 30 | 30 | 30 | 30 | 30 | 30 | 30 |
| Flame Retardant | 12 | 12 | 12 | 12 | 12 | 12 | 12 | 12 | 12 |
| Properties | | | | | | | | | |
| Spiral Flow length [mm] [@ 100 MPa] | 150.3 | 149.8 | 164.3 | 127.4 | 151.2 | 182.1 | 216.2 | 140.7 | 153.0 |
| Tensile properties @ 23° C. | | | | | | | | | |
| E-Mod [Mpa] | 10207 | 10321 | 10168 | 11766 | 11888 | 11859 | 11906 | 11687 | 12049 |
| Tensile strength [Mpa] | 130.5 | 122.5 | 111.9 | 157.0 | 149.8 | 141.8 | 134.6 | 155.3 | 163.0 |
| Elongation [%] | 1.88 | 1.76 | 1.66 | 2.07 | 1.97 | 1.83 | 1.71 | 1.98 | 2.07 |
| Notched Charpy [kJ/m2] @ 23° C. | 6.9 | 6.9 | 6.4 | | | | | | |
| HDT A [° C.] [@1.80 MPa, 120° C./h] | 301 | 299 | 296 | 305 | 290 | 293 | 288 | 298 | 294 |

TABLE 2-continued

| | CE-A | EX-VII | EX-VIII | CE-F | CE-G | CE-H | CE-I | CE-J | CE-K |
|---|---|---|---|---|---|---|---|---|---|
| UL94V | | | | | | | | | |
| 48 hrs @ 23° C./50% RH | V0 | V0 | V0 | V0 | V1 | V1 | NC | V1 | V1 |
| 168 hrs @ 70° C. | V0 | V0 | V0 | V0 | V1 | V1 | V1 | V0 | V1 |
| Overall rating | V0 | V0 | V0 | V0 | V1 | V1 | NC | V1 | V1 |
| Blistering (Jedec 2 cond) | Yes | No | No | Yes | Yes | Yes | Yes | Yes | Yes |

The invention claimed is:

1. A flame retardant polyamide composition comprising:
(A) a semi-crystalline semi-aromatic polyamide derived from terephthalic acid monomers and derivatives thereof and at least one diamine selected from the group consisting of butanediamine, hexamethylenediamine and 2-methylpentamethylenediamine;
(B) at least one semi-crystalline aliphatic polyamide having a number average molecular weight (Mn) of 10,000 to 25,000 g/mol which is selected from the group consisting of polyamide-4,6 (PA-4,6), polyamide-4,8 (PA-4,8), polyamide-4,10 (PA-4,10) and copolymers thereof;
(C) 10 to 30 parts by weight (pbw), based on 100 pbw of components (A)+(B), of a halogen free flame retardant system comprising a metal salt of a phosphinate of formula (I) or a diphosphinate of formula (II),

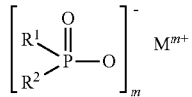
(I)

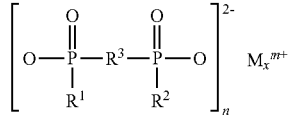
(II)

wherein $R^1$ and $R^2$ may be identical or different and are linear or branched $C_1$-$C_6$ alkyl and/or aryl;
$R^3$ is linear or branched $C_1$-$C_{10}$-alkylene, $C_6$-$C_{10}$-arylene, -alkylarylene or -arylalkylene;
M is at least one ion selected from the group consisting of calcium ions, magnesium ions, aluminum ions and zinc ions;
m is 2 or 3;
n is 1 or 3; and
x is 1 or 2; and
(D) 5 to 50 weight percent, based on total weight of the composition, of inorganic fillers and/or reinforcement agents, wherein
the semi-crystalline semi-aromatic polyamide (A) and the semi-crystalline aliphatic polyamide (B) are present in a weight ratio of (A):(B) which is in a range of 75:25-94:6, and wherein
the semi-crystalline semi-aromatic polyamide (A) has a melting temperature (Tm-A) within a range of 280–350° C., and wherein
the composition exhibits a V0 rating pursuant to UL94V and no blistering when subjected to JEDEC level 2 conditions.

2. The flame retardant polyamide composition according to claim 1, wherein the weight ratio of (A):(B) is in the range of 77:23-94:6.

3. The flame retardant polyamide composition according to claim 1, wherein the melting temperature (Tm-A) of the semi-crystalline semi-aromatic polyamide (A) is in the range of 300-340° C.

4. The flame retardant polyamide composition according to claim 1, wherein the semi-crystalline semi-aromatic polyamide (A) has a number average molecular weight (Mn) of more than 5,000 g/mol.

5. The flame retardant polyamide composition according to claim 1, wherein the at least one semi-crystalline aliphatic polyamide (B) has a melting temperature (Tm-B) of at least 220° C.

6. The flame retardant polyamide composition according to claim 1, wherein the composition further comprises inorganic fillers and/or reinforcement agents (D) in a total amount of 1-250 parts by weight (pbw) relative to 100 pbw of (A)+(B).

7. The flame retardant polyamide composition according to claim 1, consisting of:
(A) 30-76 wt % of the semi-crystalline semi-aromatic polyamide;
(B) 2-19 wt % of the at least one semi-crystalline aliphatic polyamide;
(C) 4-35 wt % of the flame retardant system;
(D) 5 up to 45 wt % of the inorganic fillers and/or fibrous reinforcement agents;
(E) 0-20 wt % of other polymers; and
(F) 0-20 wt % of other additives, wherein
the wt % are all relative to the total weight of the composition.

8. The flame retardant polyamide composition according to claim 7, consisting of:
(A) 15-40 wt % of the semi-crystalline semi-aromatic polyamide;
(B) 1-10 wt % of the at least one semi-crystalline aliphatic polyamide;
(C) 2-20 wt % of the flame retardant system,
(D) 5-50 wt % of the inorganic fillers and/or fibrous reinforcement agents;
(E) 0-10 wt % of the other polymers; and
(F) 0-10 wt % of the other additives; wherein
the wt % are all relative to the total weight of the composition.

9. The flame retardant polyamide composition according to claim 1, wherein component (D) comprises glass fibres.

10. The flame retardant polyamide composition according to claim 2, wherein the weight ratio of (A):(B) is in the range of 79:21-94:6.

11. The flame retardant polyamide composition according to claim 4, wherein semi-crystalline semi-aromatic polyamide (A) has a number average molecular weight (Mn) in a range of 7,500 to 50,000 g/mol.

12. The flame retardant polyamide composition according to claim 5, wherein the at least one semi-crystalline aliphatic polyamide (B) has a melting temperature (Tm-B) in a range of 250–300° C.

13. The flame retardant polyamide composition according to claim 1, wherein the at least one semi-crystalline aliphatic polyamide (B) has a number average molecular weight (Mn) in a range of 15,000 to 25,000 g/mol.

14. The flame retardant polyamide composition according to claim 1, wherein the flame retardant system comprises at least one metal salt of a (di)phosphinic acid selected from the group consisting of aluminum methylethylphosphinate and aluminum diethylphosphinate.

15. The flame retardant polyamide composition according to claim 1, wherein $R^1$ and $R^2$ may be identical or different and are individually methyl, ethyl, n-propyl, isopropyl, n-butyl, tert-butyl, n-pentyl and/or phenyl;

$R^3$ is methylene, ethylene, n-propylene, isopropylene, n-butylene, tert-butylene, n-pentylene, n-octylene, n-dodecylene, methylphenylene, ethylphenylene, tert-butylphenylene, methylnaphthylene, ethylnaphthylene, tert-butylnaphthylene, phenylmethylene, phenylethylene, phenylpropylene or phenylbutylene;

M is an aluminum ion or zinc ion.

16. An article which comprises the flame retardant polyamide composition according to claim 1.

17. A flame retardant polyamide composition comprising:
(A) 30-76 wt. %, based on the total weight of the composition, of a semi-crystalline semi-aromatic polyamide having a melting temperature (Tm-A) of at least 270° C. which is derived from terephthalic acid monomers and derivatives thereof and at least one diamine selected from the group consisting of butanediamine, hexamethylenediamine and 2-methylpentamethylenediamine;
(B) 2-19 wt. %, based on the total weight of the composition, of at least one semi-crystalline aliphatic polyamide having a number average molecular weight (Mn) of 10,000 to 25,000 g/mol which is at least one selected from the group consisting of polyamide 4,6 (PA-46), or polyamide 4,8 (PA-48) and polyamide-4,10 (PA-410) and copolymers thereof;
(C) 10 to 30 parts by weight (pbw), based on 100 pbw of components (A)+(B), of a halogen free flame retardant system comprising diethyl aluminum phosphinate (DEPAL); and
(D) 5 to 50 weight percent, based on the total weight of the composition, of inorganic fillers and/or reinforcement agents, wherein
the semi-crystalline semi-aromatic polyamide (A) and the semi-crystalline aliphatic polyamide (B) are present in a weight ratio of (A):(B) which is in a range of 75:25-94:6, and wherein
the composition exhibits a V0 rating pursuant to UL94V and no blistering when subjected to JEDEC level 2 conditions.

18. The flame retardant polyamide composition according to claim 17, wherein the semi-crystalline semi-aromatic polyamide (A) consists of polyamide-4T (PA-4T), and the semi-crystalline aliphatic polyamide (B) consists of polyamide 4,6 (PA-46).

19. The flame retardant polyamide composition according to claim 1, wherein the semi-crystalline semi-aromatic polyamide (A) consists of polyamide-4T (PA-4T).

20. The flame retardant polyamide composition according to claim 19, wherein the semi-crystalline aliphatic polyamide (B) consists of polyamide 4,6 (PA-46).

* * * * *